Patented Apr. 15, 1947

2,418,912

UNITED STATES PATENT OFFICE 2,418,912

INTERPOLYMER OF ISOOLEFINE AND POLYOLEFINE

William J. Sparks, Elizabeth, and Robert M. Thomas, Union, N. J., assignors to Standard Oil Development Company, a corporation of Delaware No Drawing. Application September 5, 1941, Serial No. 409,658

15 Claims. (Cl. 260—92.6)

This invention relates to hydrocarbon polymers; relates particularly to interpolymers or copolymers of an isoolefin with a triolefin and relates particularly to solid, rubbery, elastic, sulfurizable interpolymers of an isoolefin with a tertiary polyolefin having more than two double bonds.

As shown in our copending application, Serial No. 182,252, filed December 29, 1937, now Patent No. 2,356,127, it has been found possible to produce an interpolymer of an isoolefin such as isobutylene with a conjugated diolefin such as butadiene or isoprene or pentadiene or dimethyl butadiene by a low temperature technique, utilizing an active metal halide, or Friedel-Crafts type, catalyst dissolved in a low freezing solvent. The resulting interpolymers have molecular weights ranging from 15,000 to 150,000 or higher, have iodine numbers ranging from 1 to 60, and are reactive with sulfur in a curing reaction by which the plasticity of the interpolymer is largely destroyed and replaced by an elastic limit at which the material has a tensile strength ranging from 2,000 to 5,000 pounds per square inch and an elongation ranging from 300% to 1200%.

The resulting interpolymers are high grade materials suitable for replacement of natural rubber for many of its uses. The interpolymers do not, however, have all of the characteristics of natural rubber, nor all of the characteristics desirable for some particular uses, and accordingly, means for modifying the characteristics of the materials to adapt them to particular uses are important.

The present invention presents a new interpolymer in which an isoolefin, preferably isobutylene, or alternatively 3-methyl butene-1 or 4-methyl pentene-1, is interpolymerized with a tertiary triolefin or higher tertiary polyolefin by the application to a mixture of the isoolefin with the tertiary triolefin of a Friedel-Crafts catalyst or dissolved active metal halide catalyst at low temperatures.

A suitable tertiary triolefin is found in the substance known as myrcene, a hydrocarbon occurring naturally in bay leaf oil. The structure of this polyolefin is

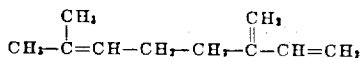

It will be observed that this is a triolefin of which one pair of double bonds are conjugated, one double bond is terminal and attached to a tertiary carbon atom. It is believed that either the conjugated system or the terminal double bond attached to a tertiary carbon atom will allow the myrcene to enter into copolymerization with the isobutylene, thus leaving two double bonds available for curing for each molecule of myrcene copolymerized. This explanation is only a matter of theory and we do not wish to be bound by any theory as to how the myrcene undergoes interpolymerization with the isoolefin.

When a triolefin of this type is employed, the copolymer with isobutylene is quite insoluble in the usual organic solvents. This is presumably due to both of the terminal double bonds undergoing polymerization and thus giving rise to some cross-linkage in the interpolymer.

As an alternative, 2,6-dimethyl-4-methyleneheptadiene-2,5, having the formula:

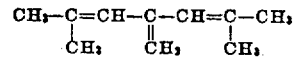

which is prepared from phorone and methyl magnesium iodide may also be employed.

Other similar tertiary triolefins are likewise usable, such as 2-methyl hexatriene-1,3,5, having the formula:

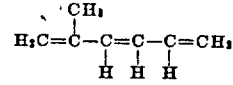

These examples, as above pointed out, deal with triolefins but the invention is not limited to triolefins as such but is applicable to any of the higher olefins having three or more double linkages in the molecule; that is, any compound having the empirical formula

$C_nH_{2n-x}$ in which $n$ is any whole number greater than 5 and $x$ is any even number greater than 2. In such a substance, it is essential that at least two of the double bonds be in the conjugated relationship; or that the compound should be a tertiary olefin with a terminal double bond attached to the tertiary carbon atom; that is, the first requirement necessitates a formula $$R-CH=CH-CH=CH-C_nH_{2n-x}$$

in which $n$ is at least 2, $x$ is any uneven number and R is hydrogen or an alkyl substituent. The last of the above requirements is satisfied by a formula

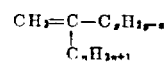

in which $n$ is any whole number, $y$ is any whole number of such value that $n$ plus $y$ is greater than 3 and $x$ is any uneven number greater than 1.

In fact, any polyolefins having three or more double bonds are applicable as long as one pair of these double bonds are conjugated or if one double bond is terminal and attached to a tertiary carbon atom.

Thus an object of the present invention is to prepare an interpolymer of an isoolefin such as isobutylene with a polyolefin or triolefin such as myrcene and related hydrocarbons, to modify and improve the characteristics of a low temperature, rubbery interpolymer. Another object is to prepare an interpolymer of isoolefin with a polyolefin in which a higher chemical unsaturation can be introduced into the polymeric body per unit of polyolefin employed in the starting feed. Other objects and details of the invention will be apparent from the following description.

In practicing this invention, an olefinic mixture is prepared consisting of the isoolefin, preferably isobutylene, with the polyolefin, the isoolefin preferably being present in the ratio of from 70 to 99 parts with the triolefin present in the ratio of 30 to 1 part. This olefinic mixture may be diluted with a diluent-refrigerant such as liquid ethylene or liquid ethane or liquid methane or mixtures of these several diluent-refrigerants, or mixtures of them with other inert diluents such as liquid propane, liquid butane, liquid ethyl or methyl chloride and the like, the diluent refrigerant being present in the proportion of from about 1 to 5 or 6 volumes per volume of mixed olefins. Alternatively, an excess of solid carbon dioxide may be utilized either with or without an auxiliary diluent such as propane, ethyl or methyl chloride or similar inert, low freezing substances. As another alternative, the olefinic mixture may be cooled by an externally applied refrigerant, the mixture being rapidly circulated past a cooled metal surface, such as cooling tubes. The polymerization temperature lies below 0° C. and preferably below −40° C. Temperatures of −78 to −100° C., or even as low as −165° C. are desirable. The catalyst preferably consists of an active metal halide catalyst, or a Friedel-Crafts type catalyst, such as aluminum chloride, bromide or iodide, or uranium or titanium chloride or $BF_3$ which may advantageously be dissolved in a low freezing solvent such as ethyl or methyl chloride or carbon disulfide or similar homologous substance. The catalyst solution is preferably applied in a finely sub-divided form either on or below the surface of the rapidly stirred mixture of the reaction mixture. The reaction proceeds rapidly to produce the desired solid, plastic, elastic interpolymer.

The interpolymer may be mixed with sulfur and appropriate fillers, plasticizers and the like, and suitable sulfurization aids such as "Tuads" (tetramethyl thiuram disulfide) by masticating on a mill. The interpolymer, when so compounded, cures into an elastic, rubberlike substance having an elastic limit, a high tensile strength and a high elongation, by the application of heat within a temperature range of 100° C. to 200° C. for a time interval ranging from 5 to 120 minutes.

*Example 1*

A mixture of 99 parts of liquid isobutylene was prepared with one part of myrcene, and 4 volumes of liquid ethylene were added to the mixed olefins. The mixture was prepared in a reactor equipped with a powerful stirring device and provided with a cover to avoid contact with air. The reactor also was well insulated to reduce the rate of volatilization of the refrigerant by ambient heat. The catalyst was prepared by dissolving commercial anhydrous aluminum chloride in methyl chloride at the boiling point of the methyl chloride to yield a saturated solution containing about 1.3% of material calculated as aluminum chloride. This solution was then diluted with an additional amount of methyl chloride to produce a solution containing 0.5% of dissolved aluminum chloride. This solution was then precooled to −78° C. and sprayed through a spray nozzle onto the surface of the vigorously stirred mixed olefins. The polymerization proceeded rapidly and was approximately 80% complete in about 5 minutes.

When this stage of polymerization was reached, the polymerization mixture was diluted with approximately equal volume of isopropyl alcohol to quench the catalyst and to arrest polymerization. The solid interpolymer was then brought up to room temperature, washed, and dried. It was found to have a molecular weight of 47,000 and an unsaturation indicative that the myrcene and isobutylene had combined in the molar ratio of 0.62/100.

*Example 2*

The interpolymer of isobutylene and myrcene obtained in Example 1 was then compounded according to the following formula:

|  | Parts |
| --- | --- |
| Interpolymer | 100 |
| Zinc oxide | 5 |
| Stearic acid | 3 |
| Sulfur | 3 |
| Tuads | 1 |

In preparing this compound, the interpolymer was worked upon the mill for a time interval of approximately 5 minutes. Then the zinc oxide was added and thoroughly incorporated into the polymer by further working on the mill. Thereafter, the stearic acid and sulfur were simultaneously added, the mill temperature during this portion of the operation being maintained at approximately 140° C. When these ingredients were thoroughly incorporated, the mill was cooled to a temperature of approximately 40° C. and the Tuads added, and the compound removed from the mill.

This prepared compound was then placed in a mold and cured at a temperature of 155° C. for 60 minutes to produce a product which was insoluble in petroleum ether and having good tensile strength and elongation properties.

*Example 3*

An olefinic mixture containing isobutylene in the proportion of 98 parts of 2,6-dimethyl-4-methylene heptadiene-2,5 in the proportion of 2 parts was prepared as in Example 1 and polymerized in the presence of liquid ethyl chloride, the mixture being cooled by solid dry ice present in the ethyl chloride solution. A solution of boron trifluoride in ethyl chloride was used as catalyst to produce an interpolymer which was compounded as shown in Example 2 to produce a strong, elastic, rubber-like substance.

The above Examples 1 to 3 inclusive are representative in character only and are applicable to other olefins than the triolefin mentioned; applicable both to other triolefins and to still higher polyolefins, such as those containing 4, 5, 6 and even more double bonds.

Thus the invention provides a new and useful interpolymer of an isoolefin with a polyolefin in which the properties of the interpolymer are modified by the changes produced from the presence of the various polyolefins in that the interpolymers contain more chemical unsaturation over corresponding interpolymer produced from isoolefins and diolefins, and therefore possess greater sulfur reactivity.

While there are above disclosed but a limited number of embodiments of the invention, it is possible to produce still other embodiments without departing from the inventive concept herein disclosed, and it is, therefore, desired that only such limitations be imposed upon the appended claims as are stated therein or required by the prior art.

The invention claimed is:

1. The process of preparing a solid, plastic, hydrocarbon interpolymer which is reactive with sulfur to give an elastic product comprising the steps of reacting together a major proportion of an aliphatic iso-olefin having 4 to 6, inclusive, carbon atoms per molecule, with a minor proportion of a conjugated tertiary polyolefin having more than two double bonds with one thereof comprising a terminal double bond attached to the tertiary carbon atom, at a temperature between 0° C. and −165° C. in the presence of a polymerization catalyst comprising a Friedel-Crafts catalyst dissolved in a solvent which forms no complex with the Friedel-Crafts catalyst and is liquid at the reaction temperature.

2. The process of preparing a solid, plastic, hydrocarbon interpolymer which is reactive with sulfur to give an elastic product comprising the steps of reacting together a major proportion of an aliphatic iso-olefin having 4 to 6, inclusive, carbon atoms per molecule, with a minor proportion of a conjugated tertiary triolefin comprising a terminal double linkage attached to the tertiary carbon atom, at a temperature between 0° C. and −165° C. in the presence of a polymerization catalyst comprising a Friedel-Crafts catalyst dissolved in a solvent which forms no complex with the Friedel-Crafts catalyst and is liquid at the reaction temperature.

3. The process of preparing a solid, plastic, hydrocarbon interpolymer which is reactive with sulfur to give an elastic product comprising the steps of reacting together a major proportion of an aliphatic iso-olefin having 4 to 6, inclusive, carbon atoms per molecule, with a minor proportion of a conjugated polyolefin represented by the formula

in which $n$ is at least 2, $x$ is any uneven number and R is a substituent selected from the group consisting of hydrogen and an alkyl substituent, at a temperature between 0° C. and −165° C. in the presence of a polymerization catalyst comprising a Friedel-Crafts catalyst dissolved in a solvent which forms no complex with the Friedel-Crafts catalyst and is liquid at the reaction temperature.

4. The process of preparing a solid, plastic, hydrocarbon interpolymer which is reactive with sulfur to give an elastic product comprising the steps of reacting together a major proportion of an aliphatic iso-olefin having 4 to 6, inclusive, carbon atoms per molecule, with a minor proportion of myrcene, at a temperature between 0° C. and −165° C. in the presence of a polymerization catalyst comprising a Friedel-Crafts catalyst dissolved in a solvent which forms no complex with the Friedel-Crafts catalyst and is liquid at the reaction temperature.

5. The process of preparing a solid, plastic, hydrocarbon interpolymer which is reactive with sulfur to give an elastic product comprising the steps of reacting together a major proportion of an aliphatic iso-olefin having 4 to 6, inclusive, carbon atoms per molecule, with a minor proportion of 2,6-dimethyl-4-methyleneheptadiene-2,5, at a temperature between 0° C. and −165° C. in the presence of a polymerization catalyst comprising a Friedel-Crafts catalyst dissolved in a solvent which forms no complex with the Friedel-Crafts catalyst and is liquid at the reaction temperature.

6. The process of preparing a solid, plastic, hydrocarbon interpolymer which is reactive with sulfur to give an elastic product comprising the steps of reacting together a major proportion of an aliphatic iso-olefin having 4 to 6, inclusive, carbon atoms per molecule, with a minor proportion of 2-methyl hexatriene-1,3,5, at a temperature between 0° C. and −165° C. in the presence of a polymerization catalyst comprising a Friedel-Crafts catalyst dissolved in a solvent which forms no complex with the Friedel-Crafts catalyst and is liquid at the reaction temperature.

7. The process of preparing a solid, plastic, hydrocarbon interpolymer comprising the step of reacting together a major proportion of a low molecular-weight aliphatic iso-olefin having less than 7 carbon atoms per molecule with a minor proportion of a low molecular-weight aliphatic conjugated tertiary polyolefin having more than two double bonds with one thereof comprising a terminal double bond attached to the tertiary carbon atom in the presence of a Friedel-Crafts catalyst dissolved in a solvent which forms no complex with the Friedel-Crafts catalyst and is liquid at the reaction temperature, the reaction being conducted at a temperature between 0° C. and −165° C.

8. The process of preparing a solid, plastic, hydrocarbon interpolymer comprising the step of reacting together a major proportion of a low molecular-weight aliphatic iso-olefin having less than 7 carbon atoms per molecule with a minor proportion of a low molecular-weight aliphatic triolefin comprising a terminal double linkage attached to the tertiary carbon atom in the presence of a Friedel-Crafts catalyst dissolved in a solvent which forms no complex with the Friedel-Crafts catalyst and is liquid at the reaction temperature, the reaction being conducted at a temperature between 0° C. and −165° C.

9. The process of preparing a solid, plastic, hydrocarbon interpolymer which is reactive with sulfur to give an elastic product comprising the step of reacting together a major proportion of isobutylene with a minor proportion of a low molecular-weight, aliphatic, conjugated triolefin in the presence of a Friedel-Crafts catalyst dissolved in an organic solvent which forms no complex therewith and is liquid at the reaction temperature, the reaction being conducted at a temperature between 0° C. and −165° C.

10. The process of preparing a solid, plastic, hydrocarbon interpolymer which is reactive with sulfur to give an elastic product comprising the step of reacting together a major proportion of isobutylene with a minor proportion of a low molecular-weight, aliphatic, conjugated polyolefin represented by the formula $$R-CH=CH-CH=CH-C_nH_{2n-x}$$

in which $n$ is at least 2, $x$ any uneven number and R is a substituent selected from the group consisting of hydrogen and an alkyl substituent, in the presence of a Friedel-Crafts catalyst dissolved in an organic solvent which forms no complex therewith and is liquid at the reaction temperature, the reaction being conducted at a temperature between 0° C. and −165° C.

11. The process of preparing a solid, plastic hydrocarbon interpolymer which is reactive with sulfur to yield an elastic product, comprising the step of reacting together a major proportion of isobutylene with a minor proportion of myrcene in the presence of a Friedel-Crafts catalyst dissolved in a solvent which forms no complex therewith and is liquid at the reaction temperature, the reaction being conducted at a temperature between 0° C. and −165° C.

12. The process of preparing a cured, elastic, hydrocarbon interpolymer comprising the step of reacting together a major proportion of isobutylene with a minor proportion of myrcene in the presence of a Friedel-Crafts catalyst dissolved in a solvent which forms no complex therewith and is liquid at the reaction temperature, the reaction being conducted at a temperature between −40° C. and −165° C., and thereafter heating the polymer with sulfur and a sulfurization aid comprising tetramethyl thiuram disulfide.

13. A synthetic solid, plastic, hydrocarbon interpolymer of a major proportion of isobutylene with a minor proportion of myrcene, the polymer being characterized by a low unsaturation below an iodine number of 50, a molecular weight above 15,000, and reactivity with sulfur to yield an elastic product.

14. A synthetic solid, plastic, hydrocarbon interpolymer of a major proportion of isobutylene with a minor proportion of a conjugated triolefin, the polymer being characterized by a low unsaturation below an iodine number of 50, a molecular weight above 15,000, and reactivity with sulfur to yield an elastic product.

15. The process of preparing a solid plastic hydrocarbon interpolymer which is reactive with sulfur to give an elastic product comprising the steps of reacting together a major proportion of an aliphatic isoolefin having 4 to 6 inclusive carbon atoms per molecule with a minor proportion of a conjugated polyolefin having more than 2 double bonds, at least 2 of which are in conjugated relationship, at a temperature between 0° C. and −165° C. in the presence of a polymerization catalyst comprising a Friedel-Crafts catalyst dissolved in a solvent which forms no complex with the Friedel-Crafts catalyst and is liquid at the reaction temperature.

WILLIAM J. SPARKS.
ROBERT M. THOMAS.

REFERENCES CITED

The following references are of record in the file of this patent:

UNITED STATES PATENTS

| Number | Name | Date |
| --- | --- | --- |
| 2,213,423 | Wiezevich | Sept. 3, 1940 |